(12) United States Patent
McKay

(10) Patent No.: US 6,189,862 B1
(45) Date of Patent: Feb. 20, 2001

(54) REPLACEABLE VALVE SEAT

(75) Inventor: Albert A. McKay, Stoney Creek (CA)

(73) Assignee: Westinghouse Air Brake Company, Wilmerding, PA (US)

( * ) Notice: Under 35 U.S.C. 154(b), the term of this patent shall be extended for 0 days.

(21) Appl. No.: 09/176,130

(22) Filed: Oct. 21, 1998

(51) Int. Cl.[7] .............................. F16K 31/00; F16K 51/00
(52) U.S. Cl. ............................................ 251/363; 137/327
(58) Field of Search .................................. 251/363, 360; 137/327, 328, 269

(56) References Cited

U.S. PATENT DOCUMENTS

| | | | |
|---|---|---|---|
| 1,708,241 | * 4/1929 | Schultheiss | 137/327 |
| 2,602,463 | * 7/1952 | Stroop | 137/327 |
| 5,871,156 | * 2/1999 | Lawson | 251/363 |

* cited by examiner

Primary Examiner—Kevin Shaver
Assistant Examiner—D A Bonderer
(74) Attorney, Agent, or Firm—James Ray & Associates

(57) ABSTRACT

A valve having a housing and a valve member located in the housing for controlling the flow of a fluid or fluid pressure directed through the housing. The valve further includes a removable valve seat located in the housing and against which the valve member engages and disengages in the fluid or fluid pressure control process. A sealing member is located between an outer surface of such valve seat and an inner surface of the housing of the valve. The removable valve seat being made of a durable molded plastic material.

2 Claims, 1 Drawing Sheet

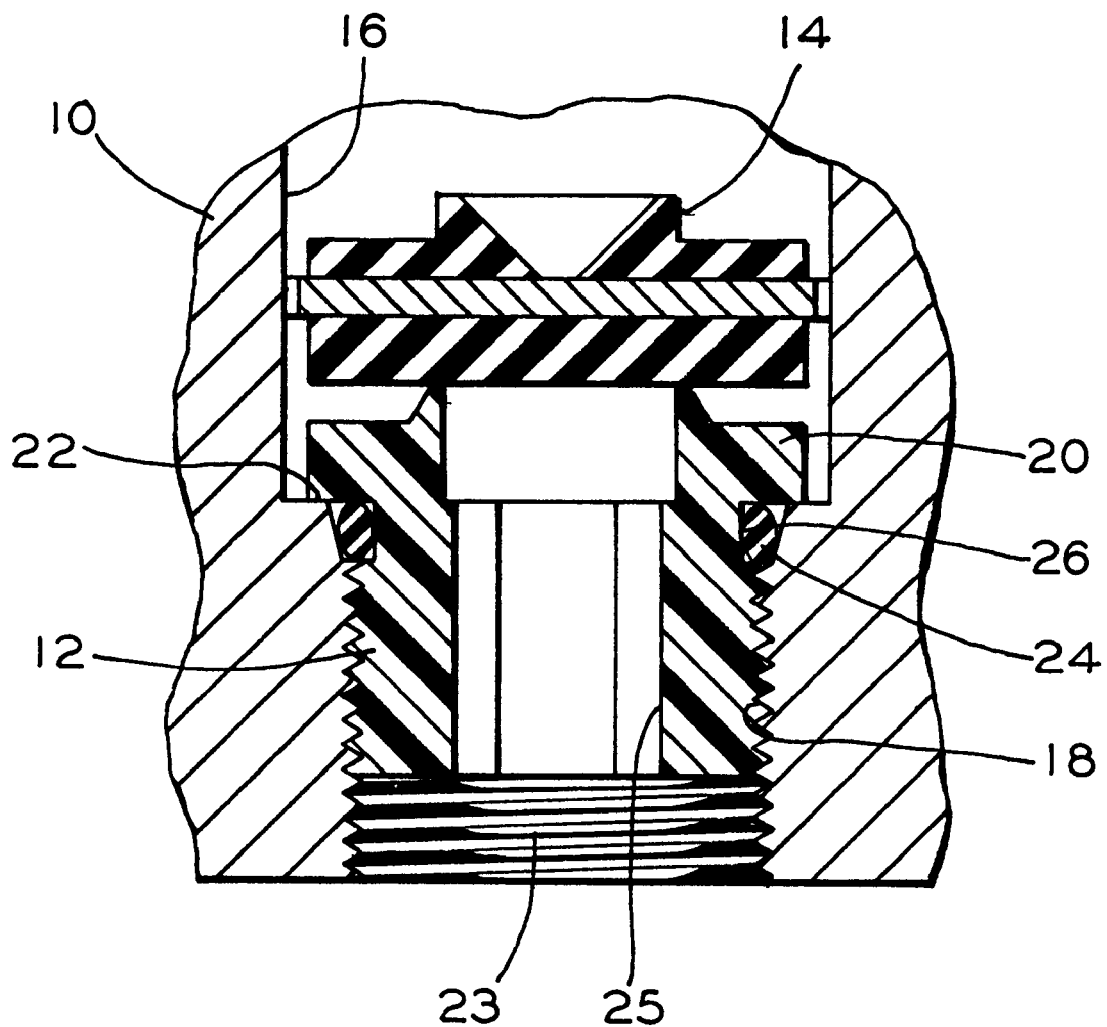

REPLACEABLE VALVE SEAT

FIELD OF THE INVENTION

The present invention relates, in general, to a fluid controlling valve and, more particularly, this invention relates to a valve seat that can be removed and replaced for repair of such fluid controlling valve.

BACKGROUND OF THE INVENTION

As is well known in the art, valves are used throughout industry, including the railroad industry, for controlling fluid flow and fluid pressures provided by a source of such fluid flow and fluid pressures such as pumps and compressors. Fluid flow and fluid pressures are conducted through such control valves and through conduits (piping, tubing and hoses) connected to these control valves.

Valve construction varies, as is equally well known, but all fluid control valves have housings and require seats against which valve members abut to block fluid flow and cut-off fluid pressure, and which disengage the seats to allow and control fluid flow and fluid pressure directed through the valves.

Current practice involves the machining of a seat in the valve body. Such machining process is costly and can give rise to valve failures due to porosity which may be present in the cast material of the valve body and nicks in the seat area caused by machining tools.

Another costly process involves press fitting a bushing seat into place in the hollow of the valve body. This practice provides a more robust seat structure but it can lead to detrimental interior fluid leakage between the pressed fitting and the valve body. The press fitting used in this process is typically machined from bar stock.

BRIEF SUMMARY AND OBJECTS OF THE INVENTION

What is, therefore, needed in the valve manufacturing industry is a relatively inexpensive, removable, replaceable and leak-proof valve seat component. The present invention provides such a component in the form of molded valve seat made of a durable plastic material placed in the interior of the valve body and sealed therein by a sealing means located between the molded plastic valve seat and the interior surface of the valve body. The sealing means can be, for example, a simple inexpensive O-ring and the molded valve seat can be made from either a durable thermoplastic or thermoset plastic material depending upon the fluids being controlled. Such materials are appropriately moldable and curable.

Injection molding is an inexpensive way to make the plastic valve seat of the invention and the assembly process of placing the valve seat and sealing means in the valve body does not involve a press fitting operation. Rather, the plastic valve seat and sealing means can be dimensioned relative to the interior dimension of the valve body to allow a simple manual, or otherwise, insertion of the valve seat and sealing means into the valve body after the sealing means is placed on an outside surface of the valve seat. For example, the interior bore of the valve body and the external circumference (shank) of the valve seat can be threaded for easy assembly and insertion of the valve seat into the valve bore. A hexagonal recess or other non-cylindrical recess profile which will allow transfer of torsional force, such as a spline or square drive, can be provided in the seat for receiving one end of an Allen or similar type wrench for effecting rotation of the valve seat. Removal of the valve seat is thereby also easily effected when valve repair is needed.

The sealing means, such as the above-described O-ring, can also first be placed in the interior of the valve body. However, this would require that the interior of the valve body be provided with a groove for receiving and seating the sealing means, whereas it is simpler and substantially less costly to mold a peripheral groove in the exterior surface of the valve seat sized to accommodate a suitable sealing means.

THE DRAWING

The present invention, along with its advantages and objectives, will be best understood from consideration of the following detailed description and the accompanying drawing, the sole figure of which is a partial sectional view of a valve body containing the molded valve seat of the invention (also in section).

PREFERRED EMBODIMENT

Referring now to the drawing, a valve body 10 is shown provided with the molded plastic valve seat of the invention. The valve seat is designated by numeral 12. Valve body 10 includes a valve member 14 shown in the drawing disposed against such valve seat 12. The valve member 14 is translated to and from such valve seat 12 by a variety of operating means. These operating means are not further discussed herein as they do not form a part of the present invention.

Valve seat 12 is a molded plastic component having a body portion sized to easily slip into a hollow forward portion 16 of the valve body 10 and into a reduced dimension, narrower bore portion 18 provided in the interior of the valve body 10 such that an integral flange 20 of the body portion of the valve seat 12 can engage and rest on an integral shoulder 22 located in the valve interior provided by the narrower portion 18 of the valve body 10.

As discussed above such valve seat 12 can be externally threaded along its shank and the interior of bore portion 18 can be internally threaded for easy and rapid assembly and disassembly of the two components. In the figure, the threads of such threaded shank of the valve seat 12 and the threads of such threaded bore portion 18 of the valve body 10 overlap and are commonly labelled by the reference numeral 23. A non-circular depression 25 is shown and which is provided in the valve seat 12 (when such valve seat 12 is formed) at a location remote from valve member 14 for receiving one end of a torque-type wrench, such as an Allen wrench.

An O-ring sealing member 24 made of a durable material is shown in the drawing located in a peripheral slot 26 provided in the outer surface of the body of such valve seat 12 to seal the valve seat 12 in the valve structure. Peripheral slot 26 is easily provided in the body of the valve seat 12 in the process of molding the valve seat 12, though, as mentioned above, a slot (not shown and less desirable) can be provided in an interior surface and wall of valve body 10. In either case, such a seal is effective in sealing against fluid and pressure leakage between the exterior surface of the body of the valve seat 12 and the interior surface of the valve body 10.

If and when the valve seat 12 and/or the sealing member 24 require repair or replacement, the valve seat 12 is easily removed from the valve body 10 and replaced with either a new or a repaired valve seat 12, along with a new sealing member 24 if one is required.

The material of such valve seat 12 is, preferably, a durable plastic material, as discussed above. What is needed is a long lasting material suitable for the environment of the fluid being handled by the valve and seat of the invention and available at a reasonable cost.

As discussed above injection molding processes are a convenient, rapid and inexpensive way to make the valve seat 12, though other appropriate processes can be used.

While a presently preferred embodiment for carrying out the instant invention has been set forth in detail above, those persons skilled in the valve art to which this invention pertains will recognize various alternative ways of practicing the invention without departing from the either the spirit of the invention or the scope of the claims appended hereto.

I claim:

1. A valve having a housing and a valve member located in said housing for controlling flow of at least one of a fluid and fluid pressure directed through said valve, said valve comprising:

a removable valve seat formed from a preselected durable molded plastic material, said removable valve seat being located in said housing and against which said valve member engages and disengages in at least one of a fluid and a pressure control process;

a molded peripheral groove provided in said valve seat for receiving a sealing means;

a sealing means located in said molded peripheral groove between and in contact with an outer surface of said removable valve seat and an inner surface of said housing of said valve; and a non-circular recess for receiving one end of a torque providing wrench provided in said removable valve seat;

said housing being provided with a radially outward slanting chamfered surface disposed opposite said molded peripheral groove for receiving said sealing means.

2. The valve, according to claim 1, wherein said sealing means is an O-ring.

* * * * *